United States Patent

Rutkowski

[15] 3,667,567
[45] June 6, 1972

[54] ROCKET POWERED GROUND EFFECT MACHINE

[72] Inventor: Eugene V. Rutkowski, Los Angeles, Calif.
[73] Assignee: TRW Inc., Redondo Beach, Calif.
[22] Filed: Feb. 26, 1970
[21] Appl. No.: 14,592

[52] U.S. Cl. ........................................................180/117
[51] Int. Cl. ........................................................B60v 1/14
[58] Field of Search ...................180/117, 118, 120, 127, 7 J; 244/74, 73, 52

[56] References Cited

UNITED STATES PATENTS

| | | |
|---|---|---|
| 3,044,566 | 7/1962 | Mayr .................................. 180/7 J X |
| 3,057,581 | 10/1962 | Tumavicus .......................... 244/74 X |
| 3,078,940 | 2/1963 | Rolle .................................... 180/127 |
| 3,188,024 | 6/1965 | Schneider ............................ 244/52 |
| 3,200,587 | 8/1965 | Tolson ................................. 244/52 X |
| 3,358,947 | 12/1967 | Bowyer, Jr. et al. .................. 244/73 |
| 3,373,836 | 3/1968 | Chaplin ............................... 180/118 |

Primary Examiner—A. Harry Levy
Attorney—Daniel T. Anderson, Donald W. Graves and William B. Leach

[57] ABSTRACT

A rocket powered ground effect machine is provided which has a self contained propellant supply which powers a rocket engine to provide gas pressure within a plenum. This type of device has particular applicability in non atmospheric conditions.

7 Claims, 3 Drawing Figures

PATENTED JUN 6 1972   3,667,567

Eugene V. Rutkowski
INVENTOR.

BY Donald W. Graves

ATTORNEY

ROCKET POWERED GROUND EFFECT MACHINE

BACKGROUND OF THE INVENTION

Ground effect machines are transportation vehicles which typically are supported above a surface without contact with the surface by providing gas pressure within a plenum chamber. Usually the gas pressure is provided by blowers or compressors which force the gas within the plenum to lift the ground effect machine off the surface. These compressors or blowers or fans are usually powered by an internal combustion engine or a turbine. Other examples include various types of pumps.

An example of a gas generator for use in a ground effect machine is found in the U.S. Pat. to Rolle, No. 3,078,940. In that patent there is disclosed a gas generator which in conjunction with the aspirator delivers gas pressure to the plenum. However, in this type of device, there is a requirement that an aspirator be provided to draw in gas from the atmosphere to augment that of the gas generator feeding into an ejector. This type of device, however, would be inoperative in a non atmospheric environment such as encountered on the moon.

SUMMARY OF THE INVENTION

This invention is characterized by a ground effect machine which has a plenum formed by a body and sidewalls and at least one rocket engine adapted to provide gaseous pressure within the plenum whereby to produce lift for the machine. The machine is substantially impervious to egress or ingress of gas to the plenum except from beneath the sidewalls and the rocket engine and further characterized by having storage means on the machine to provide all necessary propellant for the rocket engine.

DESCRIPTION OF THE PREFERRED EMBODIMENT

Figure 2:
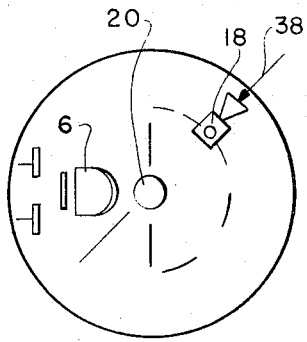
FIG. 2 is a plan view of one embodiment of this invention illustrating one manner for providing thrust.

Shown generally at 2 is a ground effect machine constructed according to this invention. The ground effect machine 2 has a body portion 4 with a seat 6 for the pilot of the ground effect machine. A control lever 8 is shown for illustration purposes only and it does not constitute a necessary feature of this invention. A propellant storage tank 10 and 12 are shown. These tanks are connected by means such as conduit 14 to a rocket engine 16. While two storage tanks are shown as illustrating an oxidizer and a fuel, it is within the scope of this invention to utilize a monopropellant rocket engine such as the use of hydrazine and a catalyst. The rocket engine 16 can be of a conventional construction and utilize a conventional injector such as is well known in the art. Shown at 18 is a thrust producing device which likewise would be connected to propellant storage tanks 10 and 12 so as to enable the ground effect machine to go forward or sideways as the case may be.

Referring to FIG. 2 this thrustor 18 is shown which can be swiveled about the center 20 whereby to vary the horizontal direction of travel of the ground effect machine.

Figure 1:
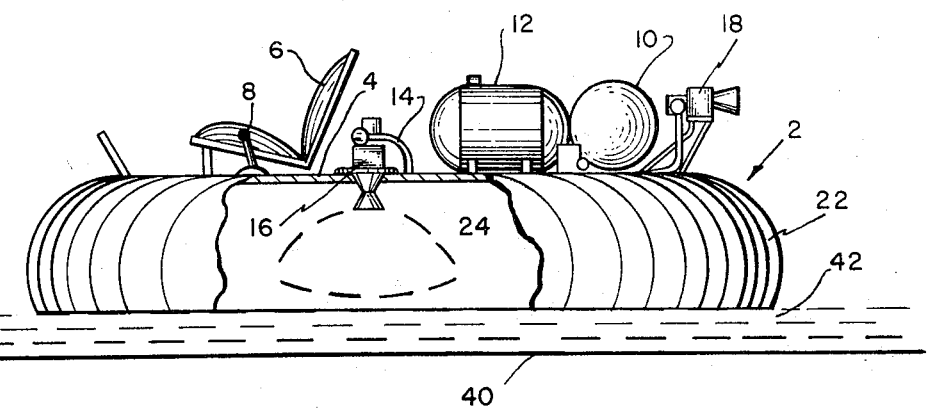
FIG. 1 is a side view partially broken away illustrating one configuration of a ground effect machine according to the invention.

Referring back to FIG. 1, the ground effect machine has a sidewall 22 to form a plenum chamber 24 illustrated in the broken away portion.

Figure 3:
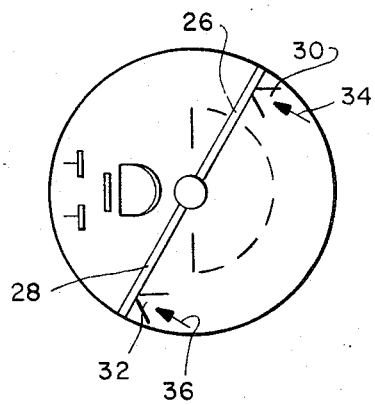
FIG. 3 is a plan view of another embodiment of this invention employing a different means for providing thrust.

Another manner of varying the thrust is shown in FIG. 3 wherein supporting horizontal arms 26 and 28 have thrusters 30 and 32 respectively. Arrows 34, 36 and 38 in FIGS. 2 and 3 illustrate direction of thrust provided by the thrusters of each embodiment.

In operation, when it is desired to lift the ground effect machine 2 off of the surface such as shown at 40, the rocket engine 16 is actuated and by receiving propellant from tanks 10 and 12 will fire and cause gas pressure to be created in plenum chamber 24. Gas will then escape from underneath the vehicle such as shown at 42.

The advantage of this vehicle over those known in the art is that there is a completely self contained propellant storage system and unlike the single known rocket engine ground effect machine as previously mentioned in U. S. Pat. No. 3,078,940 is that gas is not allowed to enter the plenum chamber since there is a completely self contained propellant supply there is no need to rely on atmosphere for either augmenting the gaseous pressure or to operate to supply one of the propellants.

I claim:

1. A ground effect machine for use in nonatmospheric environments comprising a body having a platform, sidewalls attached to said platform thereby forming a plenum chamber, a propellant source, said platform having a single opening therein, a rocket engine mounted within said opening and in a sealed relationship to said platform and adapted to generate a source of gaseous pressure from said propellant source and to supply a sole source of gaseous pressure within said plenum chamber to produce lift for said machine, said plenum chamber being substantially impervious from egress or ingress of gas except from beneath said sidewalls and said rocket engine.

2. The ground effect machine of claim 1 including storage means on said vehicle to provide propellant for said rocket engine.

3. The ground effect machine of claim 1 wherein rocket propulsion means are provided on said machine for propelling and steering said machine.

4. The ground effect machine of claim 3 wherein a plurality of said rocket propulsion means are provided on said machine.

5. The ground effect machine of claim 4 wherein said propulsion means are located at a distance from said center of gravity so as to provide propulsion and steering at said machine.

6. The ground effect machine of claim 1 wherein said rocket engine is propelled by a monopropellant.

7. The ground effect machine of claim 1 wherein said rocket engine is propelled by a plurality of propellants.

* * * * *